July 24, 1928.
D. B. HOLMES
1,678,046
PROCESS FOR MATURATION OF FRUIT
Filed Jan. 19, 1926
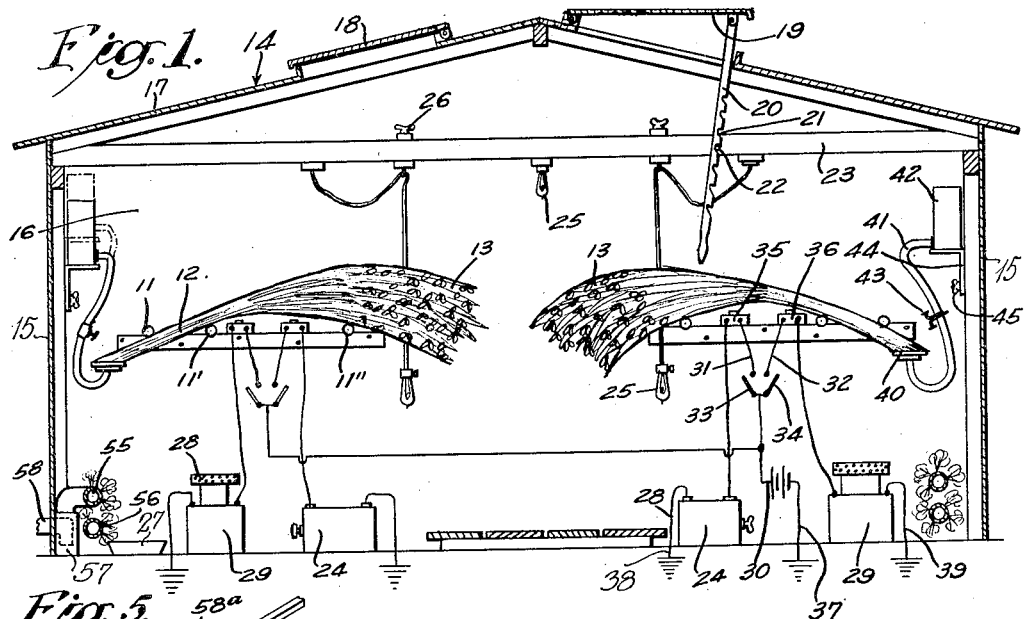
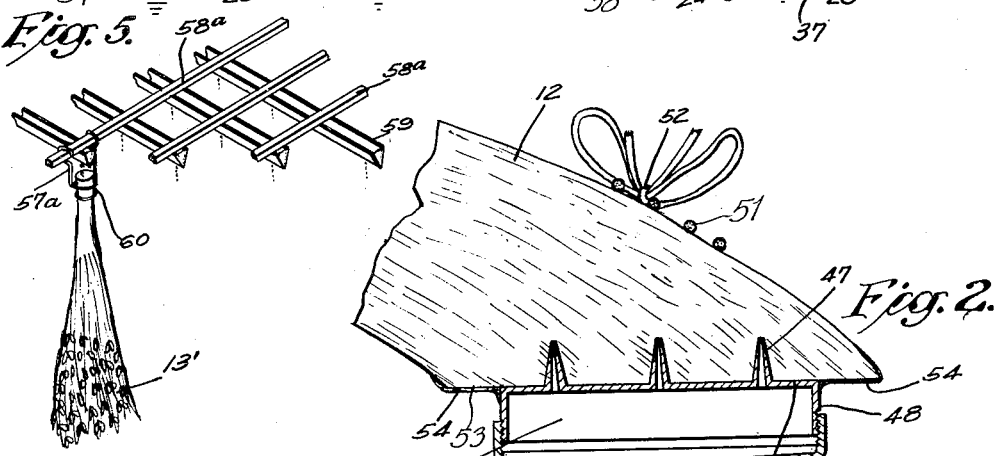
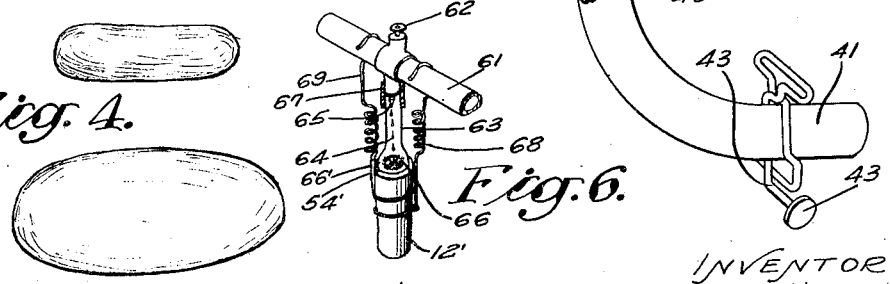
INVENTOR
DYER B. HOLMES
By
ATTORNEY Patented July 24, 1928.

1,678,046

UNITED STATES PATENT OFFICE.

DYER B. HOLMES, OF LOS ANGELES, CALIFORNIA.

PROCESS FOR MATURATION OF FRUIT.

Application filed January 19, 1926. Serial No. 82,283.

My invention relates more particularly to the maturation of dates—but the principles thereof may also be applicable to other fruits which, like dates, naturally grow in clusters or bunches of many fruit units supported on or from a single stem or branch of a parent plant, this stem or branch with its fruit units on it being severed from the parent, i. e. bodily removed, while its fruit or product is entirely or mainly immature or unripe, for further maturization or ripening in the conditions and by the methods set forth below and under conditions more favorable than are subsequently obtainable in the open air.

I will explain my invention as it applies to dates. Dates are, as is well known, the fruit of date palms, the palms being indigenous to certain desert regions of the Orient which lie easterly and southerly of the Mediterranean and are characterized, as to agriculture, by intensest sun's rays daily throughout the year, with consequent extreme heat and aridity compassing the full cycle of fruit production, generation, development and ripening on the palm by normal processes of nature.

Dates, as fruits, are one of the oldest and also the most valuable of crops which nature anywhere produces, being historically recorded as a prized food in the times of Babylon and the Pharaohs over 4000 years ago; also as a chief subsistence, in all the centuries since, of large portions of the world's population, living in or adjacent to the mentioned Oriental countries.

As a basis of a future great American industry, the finest varieties of dates were sought out in the Orient, and living palms were imported about twenty-five years ago and planted in the deserts of the Colorado River basin, where conditions in the United States most nearly matched those of the Oriental deserts; and, under the auspices and assistance of the United States Department of Agriculture, the palms have grown and fruited perfectly and have led to the department's reporting progress officially, in annual reports to Congress.

Dates are now well established in California and are of superlative excellence and are to become one of the great fruit industries of the Southwest,—thus ranking the date crop with the citrus, deciduous and vineyard crops of Southern California, each being worth millions of dollars yearly.

As compared with the Oriental desert, with its continued heat throughout the full period of ripening—a difficulty is confronted in the American semi-desert—that its summer heated term proves normally too short by four to six weeks, to accomplish the perfect ripening of this fruit on the palms, the result being serious losses in quantity, in size and in the quality of the ripened (or partially ripened) fruits on the palms.

Methods used to solve this difficulty have included the frequent picking over of the bunches, on the palm tree, and the removal each time, of such individual fruits as by appearance indicated a certain stage of partial ripening, and the forcing quickly of such detached fruits, by abnormally high heat, into condition for sale as a seasonal fruit; but the resultant fruit units have generally been inferior in size, quality and in degree of ripening as compared with fruit units normally ripened on the palms.

Dates being, however, the one crop nature produces, of greatest food value and money value per acre, and having always been grown only by Orientals, without thought of sanitation or care, date culture thus presents a challenge, in the United States, to American science to best develop this exceptional food, with its unique potential valve to American consumers for all time to come.

The conditions above indicated, have led to my invention, which I submit as novel and basic in several respects.

First, in the general concept of extending or prolonging, artificially, the period of sustenance provided by a parent plant and the conditions essential to the perfected development and ripening of its fruit or other product,—the fruit units being analogous, in some degree, to infant life deprived of natural nurture and nourishment, and dependent upon artificial means of supplying the same.

Second, in the methods, any or all, singly or in combination as hereinafter described and as may be best suited to the ripening of fruit units of a particular type at a particular time, said methods including: 1—the severing and removal from a parent plant of a fruit stem or branch having units of its fruit partially matured or ripened, and its further maturation or ripening substantially as follows: 2—The use of a maturation enclosure which may be practically air tight, with its air content pumped in through water, or the like, to free it of all germs or impurities,—the introduced fruit bunches may be washed and fumigated, materials sterilized and operatives or other persons may be cleansed and don sterilized coverings, before being placed in or entering said enclosure,—this to assure the thoroughly sanitary condition of fruit issued therefrom—preferably in sealed packages. I may thus use other enclosures, preferably adjoining the above ripening enclosures, as may be convenient for preliminary stages, or cleansing, or for storage following the ripening and packing; and similar sanitary conditions may be observed in all.

3—The maintenance, in such maturation and storage enclosures respectively, of optimum conditions of temperature, humidity, light and/or electric currents, as found best at given periods, throughout the processes of development and ripening, and of prior or subsequent storage—either approximating or improving upon nature at its best—as required to produce most perfectly developed and ripened fruit, and thereafter a keeping of such perfected fruit in storage, without deterioration, until shipped out for consumption.

4—In the process of development and ripening, to supply through the stems (as by means of a tube or tubes sealed into the end of each fruit cluster stem and connected to a container) a suitable liquid for interior circulation through the stem and into the individual fruit units. This liquid may be or may include a distilled, extracted or synthetic approximation of the sap or nutrient juices by which a parent palm tree would, if still attached, nurture and mature the fruit, if natural feeding had not been interrupted.

As supplementary to the above general and introductory explanation, I may comment that, at the present time, the period during which dates are gathered and marketed, that is to say the period during which strictly "fresh" dates are obtainable by the public, is comparatively brief,—corresponding approximately to the late fall and early winter months; and it is an important incidental object of my invention to provide means whereby the maturation of dates, or the like, may be so controlled as to extend the period during which the fresh fruit is marketable as fresh fruit over approximately the entire year.

Other objects of my invention, including certain preferred details of apparatus and method, (none of the separate parts of the apparatus being necessarily of a novel type) may be best appreciated from the following description of illustrative embodiments of my invention, taken in connection with the appended claims and the accompanying drawings, in which:

Fig. 1 may be referred to as a transverse section through one form of maturation house suitable to be used in a controlled conditioning of dates while the same are retained on cluster stems.

Fig. 2 is an enlarged detail view, showing parts of a means for controllably feeding water and/or nutritive solutions through cluster stems.

Figs. 3 and 4 are respectively detail views, and are intended to illustrate, with possible exaggeration, the difference between a date as heretofore obtained and a date produced by the practice of my invention.

Fig. 5 illustrates an alternative feeding device.

Fig. 6 illustrates an additional alternative feeding device as hereinafter described.

So far as concerns the handling of a date crop, my first fundamental departure from customary practice consists in gathering entire clusters of dates, at about the time the first individual fruit units are ripe, by cutting the cluster stems. These cluster stems are preferably cut, in a flat but inclined plane, comparatively near their point of attachment to the trunk of the palm tree upon which they are borne; and the entire clusters, preferably with their stems shortened to a standard length or lengths, may then be removed to a maturation house of somewhat the general character illustrated diagrammatically in Fig. 1.

As shown, each house may contain, at a convenient elevation or elevations, benches or racks comprising longitudinal bars or other members 11, 11' and 11", by or between which the cluster stems 12 (preferably shortened sufficiently to bring the clusters 13 into a conveniently accessible central region) may be supported; and each maturation house 14 may comprise (in addition to enclosing side walls 15, end walls 16, and a roof 17) any desired glazed or unglazed windows 18, and/or ventilation openings 19,—the latter being shown as adjustable by means of rods 20,—which may be provided with, e. g. mere downwardly inclined slots 21 variously engageable with a pin or pins 22 upon transverse overhead members 23.

In order to permit a desired temperature and/or illumination to be obtained through the entire twenty-four hours of each day, or through any preferred fraction thereof, I may employ means such as electric heaters 24 and/or electric lights 25; and, in order to vary the angle of incidence of the light rays, from said lights, upon the dates or other fruit units in the respective clusters, the positions of said light may be variable, as by changing the point of suspension of the same from the overhead members 23,—means such as thumb screws 26 being optionally provided, to facilitate such adjustment.

In order to control not merely the temperature and/or illumination within the house 14, or its equivalent, but also the humidity of the atmosphere therein (as for the purpose of preventing undue evaporation through the skins of the fruit units) I may also provide humidifying means such as mere open receptacles 27, or centrifugal humidifiers 28,—the latter, when provided, being preferably operated by electrical means such as motors 29; and, if desired, I may employ a single source of current 30, shown as connected with parallel branch circuits 31 and 32 respectively containing manual switches 33 and 34, and optionally containing automatic control devices governing the energization of both the heaters 24, or their equivalents, and the humidifier motors 29, or their equivalents. For example, in each circuit or branch 31, containing the heaters 24, I may interpose a temperature-responsive control device 35; and in each circuit or branch 32 I may interpose a humidity-responsive regulator 36,—grounding connections 37, 38 and 39 being optionally employed, as equivalent to complete return circuits.

Instead of or in addition to the described means for providing moisture, I may, if desired, bring moisture, with or without nutrient materials in solution, directly to the cut ends 40 of the respective cluster stems; and any liquid fed into said cluster stems may be delivered thereto in any desired quantities, and under any preferred moderate pressure, by means of the general character illustrated in Figs. 1 and 2 as comprising tubes 41, connected with an elevated supply 42 and respectively provided with valves or adjustable cocks 43. At the outlet end of each of the mentioned tubes, which are preferably flexible and of sufficient length to permit of a relative elevation or depression of the receptacles 42 (as by suitable adjustment of brackets 44 by means of wing nuts or thumb screws 45) I may provide delivering members 46, shown as carrying nipple-like pointed outlet projections 47, adapted to be pressed into the cut surface of the fibrous tissue of the respective cluster stems 12. The delivering members 46 may be practically circular in outline and may be provided with means, such as an external thread 48, for their retention in corresponding apertures in continuous troughs or separate cups 49,—the latter being shown as provided with inlet nipples 50, by which the mentioned tubes 41 are connected therewith. The mentioned delivering members 46, or their equivalents, may be attached in any suitable way, as by mere cords 51, shown as knotted at 52; and any portion of the respective cut surfaces 53 of the cluster stems 12 may be sealed, as by a suitable water-excluding coat 54,—the composition of which may resemble so-called "newskin."

It will be understood that whether or not the solution fed from the receptacles 42 (which may be closed at their upper ends by wads of sterile cotton in a manner well known to bacteriologists) contains decomposable organic nutrient materials (such as sugar and/or mineral salts and/or juices expressed from removed sections of cluster stems and/or other materials counterfeiting or improving upon the materials naturally delivered through the cluster stems 12 when the latter remain attached to the date-bearing palms) the solutions fed, for interior circulation, are preferably sterile; and they may even contain minute quantities of a suitable preservative and, if desired, sterile or washed air and/or a preservative or germicidal gas, may be continuously or intermittently admitted to each maturation house, as by means of perforated pipes 55 and 56,—the former being shown as connected with the outlet of a wash box 57, into which air may be fed through pipe 58.

I have indicated above that, in determining the time for cutting the cluster stems of dates, or the like, I may be guided by indications of a natural ripening; and that I may take the clusters with variable stems as long as are conveniently obtainable,—subsequently reducing the same to a standard length or lengths and optionally utilizing the juices of the eliminated stem scraps in producing, as by mechanical expression of the sweet juice, a nutrient solution. Disposing the clusters somewhat as diagrammatically suggested in Figs. 1 and 2 of the accompanying illustration (in which the flat-cut ends of cluster stems are shown as thrust down between rear or outer parallel bars 11, 11', so that the clusters, held by the leverage of their own weight, may overlie additional bars 11") I may employ any preferred means (as a mere trough, or the described means) for feeding thereto, at a desired rate and under a desired pressure, and for as long a period as may be found profitable, an aqueous or other liquid—with or without special ingredients designed to improve color or flavor or texture of nutritive value or keeping quality, or the like; and this "bottle-feeding" may be conducted under optimum conditions predetermined with regard to the nature of the fruit, the qualities desired, and the intended time of marketing,—and regardless of increasingly unfavorable conditions, such as the shortening of the day, in the open. For example, unless the ripening is desired to be extremely gradual, the temperature may be kept between 80° and 160° F.—higher temperatures being of course in general more favorable to rapidity of maturation, with its incidental transformation of cane sugar into invert sugar. During this time, some natural illumination and ventilation being presumably secured by small or large windows or other openings 18, 19, such illumination may be supplemented and/or rendered continuous in the general manner indicated; and purified and/or otherwise treated air may be admitted as required,—a predetermined humidity (as a humidity between 25% and 50% of saturation) may be maintained,—primarily to check evaporation losses such as would otherwise occur incidentally to the use of elevated temperatures.

A liberal use of light is found generally to tend to the darkening of dates,—some varieties of which may otherwise remain practically translucent; and "bottle-feeding" may give to dates which would, in nature, have substantially the configuration illustrated in Fig. 3, a plump and attractive outline of the general character suggested in Fig. 4,—in which plump and enlarged form dates have never, so far as known, heretofore been obtained.

Unless for the purpose of a very gradual maturation, to supply a late market, temperatures below 80° F. are not, in general, to be advocated in the artificial maturation of dates; and "bottle-feeding" thereof may not ordinarily be continued for more than about two months. In this connection, it should be noted that, after the ripening processes, whether naturally or artificially completed, have largely or entirely converted the cane sugar, contained in the date, into invert sugar, the danger of fermentation subsequently to packing may be regarded as negligible; and a gradual improvement in texture and attractiveness may then continue for some weeks or months, even though the fruits, then picked from the cluster stems, be packed and stored under conditions permitting very little access of light or air. From the point of view last indicated, my completed process may be regarded as including in its broadest aspects, (1) a prematuration by natural development, on the tree; (2) an artificial maturation, in cut clusters, under optimum conditions of feeding and environment appropriate to the specific effects desired; and (3), optionally, a post-maturation or curing, during storage (while awaiting gradual distribution throughout a full crop year or longer—for use as a daily diet, like other articles of commerce or manufacture) continued after the plump and/or enlarged individual fruit units have been removed from the cluster stems. The first of these steps is admittedly old, the essential novelty of my invention lying in the intermediate or maturation step or steps, in the complete process including such step or steps, and in the means and materials employed in the execution of said processes.

As illustrating a variation in the feeding means available, I suggest, in Fig. 5, the support of clusters 13' (by hooks 57ª) from rods or poles 58ª in such manner that a nutrient or other solution, dripping under control of plugs or cocks (not shown) from pipes or troughs 59 may drip directly upon cut ends 60 of cluster stems. Thus the same nutrient or other solution may serve both for a feeding effect and for some humidifying effect; or glass sight tubes (not shown) may enclose the drip columns.

In Fig. 6 I show an alternative which is comparable to that just described, but in which, mere pipes 61 supplant both the rods or poles 58 and the troughs 59 of the form shown in Fig. 5,—in the sense that said pipes serve both for the support of clusters and for the distribution of water and/or a nutrient solution. In this case, as in the first-described embodiment of my invention, the solution fed may be kept from contact with the air; and in order nevertheless to permit not only a control of the rate of feed but an observation thereof, I may provide the delivery branches or outlets from said pipes not only with separate valves, as needle valves 62, but with sight tubes 63 of glass or another transparent material permitting accurate observation of the frequency at which drops 64 descend from an interior tip 65 onto the cut end of a cluster stem 12', or onto any desired interposed material such as a mat 66 of absorbent cotton,—shown as secured within a "bell" enlargement 66' at the lower end of said transparent tube.

A sealing material, as above described may, in this case, be applied as at 54' to any cut surface left exposed outside the "bell" 66'; a rubber tube may be used at 67; and resilient means, such as springs 68 integral with the supporting springs 69, may be so employed as normally to hold all parts in assembled relationship. Thus, using either the methods and means shown in Figs. 1 and 2 or those shown in Fig. 6, a sap-substitute may be fed internally, without exposure to the air and in a manner simulating natural feeding through an uncut stem.

Although I have herein described alternative embodiments of my invention, as applied to a palm-tree cluster-fruit, it should be understood that various features thereof might be independently employed, and also that numerous modifications, additional to those suggested above, might be devised, by those skilled in the art to which this case relates, without involving the slightest departure from the spirit and scope of my invention, as the same is indicated above and in the subjoined claims.

I have above emphasized more particularly the type and technique of a maturation appropriate to the obtaining of a maximum crop of superior fruit units; but it has also been mentioned that my invention aims at a marked prolongation of the period during which fresh dates shall be obtainable by the public. Whereas the date crop, as matured each autumn is now commonly hurriedly packed for the ensuing holiday trade, the practice of my invention has the great merit of enabling the sale of fresh dates to be made with due regard to market requirements and to the needs of the public,—and, in view of the advantages of a comparatively slow maturation followed by a more or less prolonged curing at a more moderate temperature, it is my expectation that a large part—perhaps the major part—of each date crop may, hereafter, be marketed—in the superlative condition indicated—some twelve to fifteen months after the cluster stems of a given crop are cut; and since the dates easily drop off when thoroughly ripe (preferably onto conveyors, not shown, and as a result of slight intentional agitation of the cluster stems) a very large part of this period may be spent in a storage house,—preferably adjacent and somewhat similar to the described maturation house, but provided with means (not shown) for the handling and support of trays and boxes, rather than date clusters. In this storage house I ordinarily prefer temperatures substantially below those indicated above (as above 60° F.) and the humidity may be correspondingly depressed, as to a level simply maintaining—or very slightly increasing—the weight of the units; but it will be obvious that all temperatures and other conditions set forth are merely illustrative, and are subject to wide variation according to the material in hand and the results in view.

I claim as my invention:

1. A method of conditioning soft and edible fruits containing sugar and growing in clusters which comprises: cutting the cluster stems thereof at a time when the first units are approximately rip; removing the same to an enclosure and maintaining the same in artificial conditions more continuously favorable to a desired effect than are thereafter provided in nature; and subsequently picking said fruit units from said cluster stem,—said cluster stems being controllably supplied with a nutrient solution simulating the natural juice thereof.

2. A method for the maturation of cluster fruits which comprises: removing from the parent plants fruit clusters, while most of the unit fruits are still unripe; placing such clusters, for further development, within enclosures wherein conditions of temperature, humidity and/or light may be controlled and continuously or intermittently maintained; supplying to said fruits, by interior circulation introduced through the cluster stems, a synthetic approximation of the sap or juices natural to the parent plant,—with any desired modifications to shorten or lengthen a growing period, enlarge unit fruits, improve the food content, flavor and texture of the same, during the completion of ripening.

In testimony whereof, I have hereunto set my hand at Los Angeles, California, this 7th day of January, 1926.

DYER B. HOLMES.